United States Patent

Bruegmann et al.

[11] Patent Number: 6,081,626
[45] Date of Patent: Jun. 27, 2000

[54] METHOD AND SYSTEM FOR BACKGROUND REMOVAL IN ELECTRONICALLY SCANNED IMAGES

[75] Inventors: Winfried Bruegmann, Altdorf; Horst Schroeder, Herrenberg, both of Germany

[73] Assignee: International Business Machines Corporation, Armonk, N.Y.

[21] Appl. No.: 08/776,234

[22] PCT Filed: May 9, 1995

[86] PCT No.: PCT/EP95/01747

§ 371 Date: Jan. 9, 1997

§ 102(e) Date: Jan. 9, 1997

[87] PCT Pub. No.: WO96/36008

PCT Pub. Date: Nov. 14, 1996

[51] Int. Cl.[7] .............................. G06K 9/40; H04N 1/409
[52] U.S. Cl. ...................... 382/260; 382/275; 382/176; 358/463; 358/464
[58] Field of Search .................................. 382/176, 254, 382/260, 264, 266, 267, 275, 173; 358/462, 447, 448, 463, 464

[56] References Cited

U.S. PATENT DOCUMENTS

| | | | |
|---|---|---|---|
| 5,142,589 | 8/1992 | Lougheed et al. | 382/257 |
| 5,335,292 | 8/1994 | Lovelady et al. | 382/163 |
| 5,710,830 | 1/1998 | Holeva | 382/173 |

FOREIGN PATENT DOCUMENTS

| | | | |
|---|---|---|---|
| 7004565 | 3/1979 | Netherlands | G06K 9/00 |
| 311541 | 3/1973 | United Kingdom | G06K 9/12 |

*Primary Examiner*—Scott Rogers
*Attorney, Agent, or Firm*—Karl O. Hesse

[57] ABSTRACT

A process and system for separation of foreground information from background information in a document is described. In an initial stage, at least two images of a document are created, each with different filtering. One of the images is filtered so that only foreground information, or fragments thereof, remain. This image serves as the initial image for subsequent image restoration, while the remaining images represent reference images for the image restoration. In a second stage, the image restoration is carried out so that as much as possible of the foreground information which was lost by filtering from the initial image is restored again. By comparing information from the initial image with information from at least one reference image, the information remaining in the initial image is supplemented by foreground information from at least one reference image. Information to be supplemented from a reference image is selected with the aid of a suitable selection method such as for example, an adjacent point method. Individual areas of specific size are imposed around information points which possess foreground information content in the initial image, as well as in each of the reference images. The method adds information points from a reference image to the initial image to restore original foreground information content but not restore background information.

14 Claims, 7 Drawing Sheets

METHOD AND SYSTEM FOR BACKGROUND REMOVAL IN ELECTRONICALLY SCANNED IMAGES

BACKGROUND OF THE INVENTION

1. Field of the Invention

The invention relates to the separation of foreground information from background information in a document.

2. Description of the Art

In order to be able to carry out an image or character recognition procedure (optical character recognition) in an electronically-scanned and digitalized document, it is frequently necessary, in an initial preparatory stage (image preprocessing) for foreground information to be separated from the background information. In this situation, the foreground information is often the actual image information which comes into consideration for the character recognition, while the background information in many cases has an interfering effect, and may even lead to misinterpretation of the foreground information. The background information of the picture also frequently contributes to a reduction in the identification performance of the foreground information. The background information should therefore, for preference, be removed before the picture or character recognition. Foreground information, which is intended to represent a script, is, in many applications, required to be converted by the subsequent character recognition, for preference into ASCII data.

The background data in a picture is in most cases composed of the following groups: interference in digitalization (such as noise), and components of the digitalized document which cannot be filtered out (such as dirt, script fragments, stamps, etc.). In order to achieve the best possible identification rate in a subsequent processing stage, the image data should, for preference, after an image processing procedure, only contain that data which it is intended should be processed later by the character recognition process. The better the image processing prior to recognition, the more favorable the recognition results can be expected to be.

Many image processing units expect, as input, an image reduced in the grey scales; e.g. a binarised black/white image. For the production of an electronically-scanned image of document, reader devices (scanners) are frequently used, which supply images at a predetermined scanning frequency (e.g. 200 to 300 pixels per square inch), with a large number of grey scales (e.g. 16 or 256 grey scales).

Due to a series of potential faults when a document is being read in, such as, for example, scanner tolerances or an inadequate match or balance between the individual laser elements of a scanner, it is possible that a series of influencing factors may arise as early as at this stage, which could exert a disadvantageous effect on image recognition. Likewise, the type and quality of the document itself may decisively influence the image recognition. For example, color contrasts which may be present might be lost during the conversion of a color image into a grey image. In the case of handwritten entries on a document, but with typewritten entries too, the readability and recognition capacity also depend in particular on the degree of contrast involved, caused for example by a more or less strong pressure exerted when writing, etc.

For a series of applications, there is a requirement for what is known as an archive picture to be created in addition to the character recognition, in order, for example, to reduce the amount of paper used. In other words, two images have to be created, which should, as far as possible, be done without loss of throughput. Of the applications available at the moment, black/white pictures are used for this purpose, both for the recognition unit as well as for archiving purposes. Grey scale images must be intensively compressed and decompressed by computer processing, which accordingly means they have a higher memory requirement than black/white pictures.

By electronic scanning of a document, an electronic image of the document is obtained, in which an image value is allocated to every pixel, for example a grey value, a black or white value, or a color value. By means of the use of filters, these allocations can be influenced. With the use of a threshold value filter, for example, the picture values above or below a predetermined threshold value can be filtered out of the electronic image. Thus, for example, the background information which is not desired for an image processing procedure, or interference effects, can be eliminated.

The image values which are filtered out, however, will no longer be available thereafter for image recognition. Foreground information which may be inadvertently filtered out might therefore falsify the result of subsequent image recognition. Depending on the value of the threshold value, more or less information will be lost. The choice of the threshold value therefore acquires paramount significance for the quality of image recognition.

To generate binary images from grey scale images, static or dynamic conversion algorithms are frequently used. To achieve a less contaminated background, color filters are frequently used, or the document is illuminated with the appropriate colored light. Traditional filter operations (such as morphological) are used to eliminate selected structures (such as straight horizontal or vertical lines), and are tailored to specific events in a specific environment (document type).

According to the book by Peter Habercker, "Digital Image Processing", Carl Hanser Verlag, Munich and Vienna, ISBN 3-44614442-0, 1985, a series of procedures for image processing are known, which can also be applied to an image preprocessing procedure. In particular, this describes operations in the locational vicinity (Section 8), processes for smoothing the grey values (Section 8.1), and the use of difference operators (Section 8.2), as well as procedures for dynamic threshold value determination (Section 12.3).

An overview of the best-known processes for determining a threshold value is provided in P. K. Sahoo, S. Soltani, and A. K. C. Wong, "A Survey of Thresholding Techniques", Computer Vision, Graphics and Image Processing 41, 233–260, 1988. A distinction is drawn in this work between histogram transformation methods, which change the form of a histogram of a grey value allocation in order to determine the threshold value, and algorithms for threshold value calculation.

From U.S. Pat. No. 4,590,606 and U.S. Pat. No. 5,038,381, further procedures are known for image processing, such as foreground filters by means of transit-time behavior.

EP-A-0.505.729 describes a system for binarisation of images, which will make possible the reading of documents with a normal print quality.

One thing which is, however, common to all processes with filtering-out of information from an electronic document is that the filtering process may cause the loss of information which is necessary for image recognition.

SUMMARY OF THE INVENTION

It is the task of the invention to create a process for the treatment of documents which will allow for the best possible separation of foreground and background information.

It is further the task of the invention to create a process for the preliminary handling of documents, prior to image processing, which will make possible the best feasible recognition of the information.

The tasks of the invention are resolved by he independent claims. Other advantageous embodiments of the invention are provided in the subclaims.

According to the invention, initially at least two electronic images of a document are created, each with a different type of filtering, e.g. a threshold value filtering process. The intention in this context is that an image should be filtered in such a way that essentially only foreground information, or fragments of it, are retained in the image. This image serves as the initial image for subsequent picture restoration. The task of restoration is to recover as much as possible of the foreground information which is lost in this initial image. The remaining filtered images, which are less strong than the initial image serve as references for this. In this context, it should be understood that even an unfiltered image of the document, or the document itself, can be used as the reference image.

Picture restoration, starting from the information in the initial image, is effected by supplementing the information in the initial image with the information from at least one reference image by comparing the information from the initial image with the information from at least one of the reference images in the locality corresponding to the information of the initial image. In this context, these supplements can be incorporated as new information into the initial image, or, separately from this, can be stored together with the information from the initial image in a new resultant image.

The selection of the supplementary information from the reference images takes place with the assistance of a suitable selection scheme. For preference, a series of adjacent point considerations may be used as selection schemes, or other criteria such as information densities. If information densities as used as the selection scheme, then, for example, only those image points which are located in a locality which is larger or smaller than a specified pixel density will be reconstructed. In this way, individually located points can be excluded from the restoration process. Information density as a selection scheme can also be used in combination with other selection schemes such as adjacent point consideration.

For an adjacent point consideration, individual areas with a specific size are defined, both in the initial image as well as in each of the reference images, around those points (information points) which have an information content in the initial image. Information which is present in addition to the information points in the corresponding area of each of the reference images is either added as a supplement to the initial image, as new information, or otherwise discarded together with the information from the initial image. In this context it is to be understood that such image points, the information of which has been filtered out by filtering from the original document, constitute image points without any information content.

The size of the individual areas around the information points can be determined either for all the information points, equally or adaptively, e.g. in accordance with a particular information density. By selecting the size and shape of the areas, the degree of restoration per run through can be influenced. If a small area is chosen (e.g. only those points immediately adjacent to an information point), then the image content which is already present, but which is represented as weaker by the filtering, will be directly supplemented. A trace which has been reduced in its thickness will be amplified in this manner. If too large an area is selected, it is possible that interference points which may already have been filtered out will be retained, without this being desired.

For specific applications, it may be appropriate, depending on the situation, to consider as information points only those which were originally present in the initial image, or also by using as information points the image points which were adopted into the initial image as new information by the supplements. By means of the latter procedure, line traces which may have become fragmented can be restored to advantage, but it is also possible that unwanted areas may be "resurrected". New supplemented information in an image need not, however, necessarily represent new information points.

As a master for the electronic images, images derived from the original image may be used, such as individually color-filtered images. This makes it possible, with multi-colored images, to restore color-coded information individually in each case, or to obtain suitable recognition features for the restoration from a comparison of the different colors.

The process according to the invention makes it possible to create an archive image, and an image for character recognition by means of a scan process. Any desired type of scanner can be used for this, provided that a slight grey scale difference is maintained between the background data and the foreground. The identification rates can be substantially increased by the process according to the invention in comparison with a simple, non-restored black/white image. Identification rates on a character basis can be increased in one embodiment from 75% to 81%.

The process according to the invention can be implemented for preference as a program (software) in electronic data processing.

BRIEF DESCRIPTION OF THE DRAWINGS

For a more detailed explanation of the invention, some embodiments are described hereinafter, with reference to the drawings. Elements which have the same function will bear the same reference characters.

FIGS. 4*a–f* show a successive restoration process as a sequence;

DETAILED DESCRIPTION OF THE PREFERRED EMBODIMENT

Figure 1A:
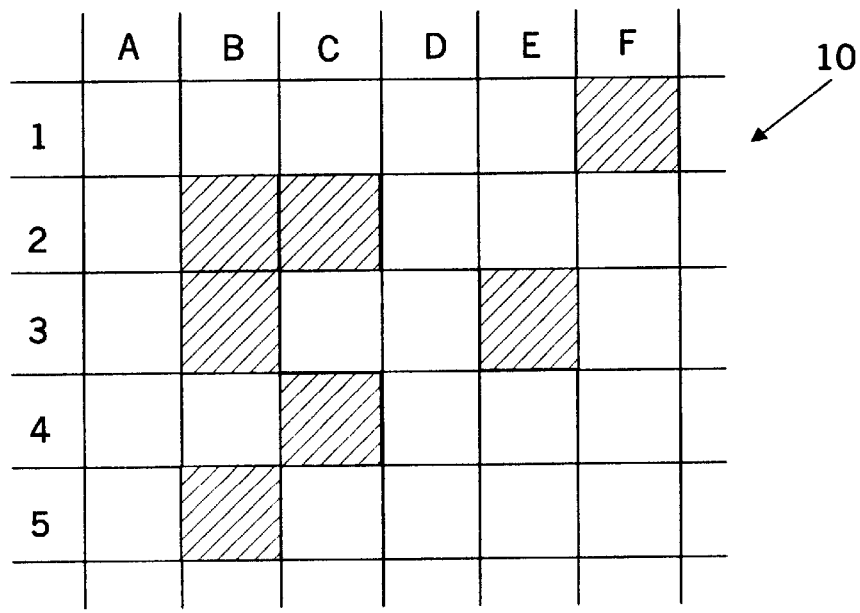
FIG. 1*a* shows a section of a weakly-filtered reference image of a document.

For a separation of foreground and background information according to the invention, in one embodiment, two electronic images are first created from a document, each with a different information content. This is preferably effected by producing two black/white images, each with a different threshold value, which are produced from a grey scale image of the document. The first of the black/white images should essentially no longer contain any background data, while the second black/white image should essentially contain all the image data, in other words also the background data. For example, an initial static threshold value of about 50% can be applied for the first black/white image; i.e. information with a grey value of above 50% of a maximum grey value will be lost. A second static threshold value of about 90% can be used accordingly for the second black/white image. It is, however, advantageous to employ dynamic threshold values. It is to be understood that the second image can also be used directly, even without threshold value filtering.

When producing the first black/white image (essentially without background data), it is also possible, however, that some data belonging to the foreground and which will be needed for character identification will be lost. The first black/white image is now used as an initial image for an image restoration process, with the goal of recovering as much as possible of the foreground information which has been lost in this image. The second black/white image serves as a reference image for this. For image restoration, adjacent point consideration, as hereinafter described, is preferably employed.

Adjacent point consideration is based on the principle that, taking the information in the initial image, which essentially represents the foreground information, or fragments of it, as a basis and comparing this initial image information with the corresponding information from the reference image, the information from the initial image can be supplemented by the information from the reference image, with the aid of a suitable comparison scheme. This way the information which is no longer present in the initial image can be restored again.

For an adjacent point consideration, individual areas with a predetermined size, which have an information content in the initial image (information points), are imposed in the appropriate manner both in the initial image as well as in the reference image. Information which is present in the particular corresponding area of the reference image, but not in the initial image, is added as new information as a supplement either into the initial image or otherwise, for example in a new resultant image, deposited together with the information from the initial image. In this context it is to be understood that such image points, the information of which has been filtered out by the (threshold value) filtering from the original document, represent image points without any information content.

The size of the individual areas about the information points can be determined for all information points, either equally or adaptively, e.g. according to the individual information density. It may also be more appropriate, for an individual application, either to regard as information points only those points which were originally present in the initial image, or also to use as information points those image points which were incorporated into the initial image as new information.

In order for the restoration process to be capable of repetition several times over for an image or part image, the image which has just been created is used for any second run which might be necessary. In order to suppress the restoration of undesirable background data, which is entirely possible by the process described, isolated image points are preferably left out of consideration from the reference image during restoration, by not selecting so large an area. This is, however, only necessary during an initial cycle over the image, since isolated image points are already eliminated at that stage.

It is to be understood that the invention is not restricted to the use of black/white images, but that any desired images can be used, with individually different information contents. It is also possible to use additional images instead of the two images, with the result that any desired image property, such as horizontal or vertical lines, background patterns, etc. can be extracted and later restored to or combined with the desired results image.

Figure 1B:
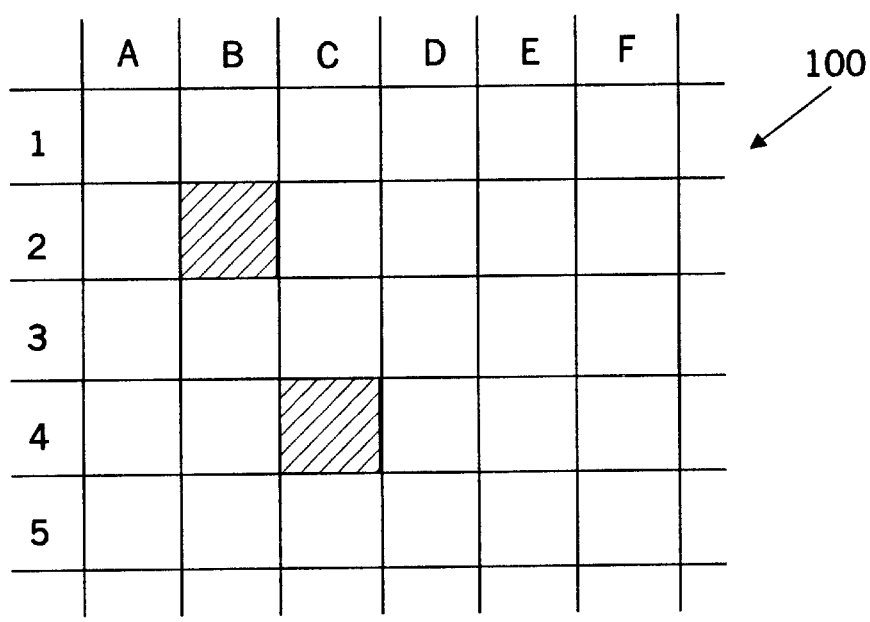
FIG. 1*b* shows the section corresponding to FIG. 1*a* of an initial image of the document, strongly filtered in this manner, which now contains only fragments of the foreground information, in this case of the line trace.

An embodiment of an adjacent point treatment process is shown hereinafter. It should be noted that, in order to illustrate one possible application of the invention, the image points B2, C2, B3, C4, and B5 are intended to represent a trace, while the image points F1 and E3 are intended to reflect accidental contamination of the document. FIG. 1a shows a section 10 of a weakly-filtered reference image of a document, the document not being shown. FIG. 1b shows the corresponding section 100 of an initial image of the document, so strongly filtered that only fragments of the foreground information are contained, in this case the trace.

The co-ordinates shown, A–F, provide the horizontal position and the co-ordinates 1–5 provide the vertical position of an image point. As can be seen from FIG. 1a, the section 10 of the reference image features the image points F1, B2, C2, B3, E3, C4, and B5. The corresponding section 100 of the initial image in FIG. 1b now only contains the image points B2 and C4. The image points F1, C2, B3, E3 and B5 have been lost due to corresponding filtering.

Figure 2A:
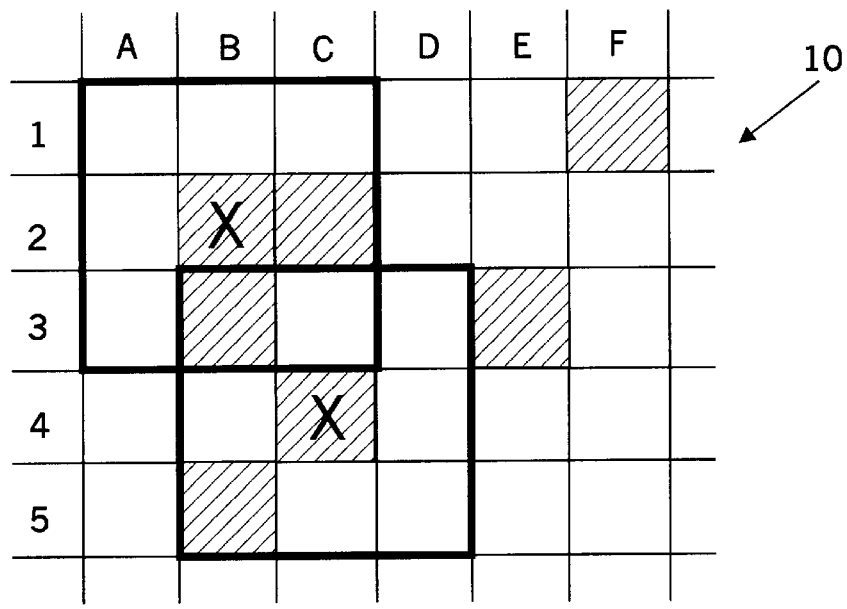
FIGS. 2*a–b* show the adjacent point restoration with a restoration area containing 3×3 image points.
Figure 2B:
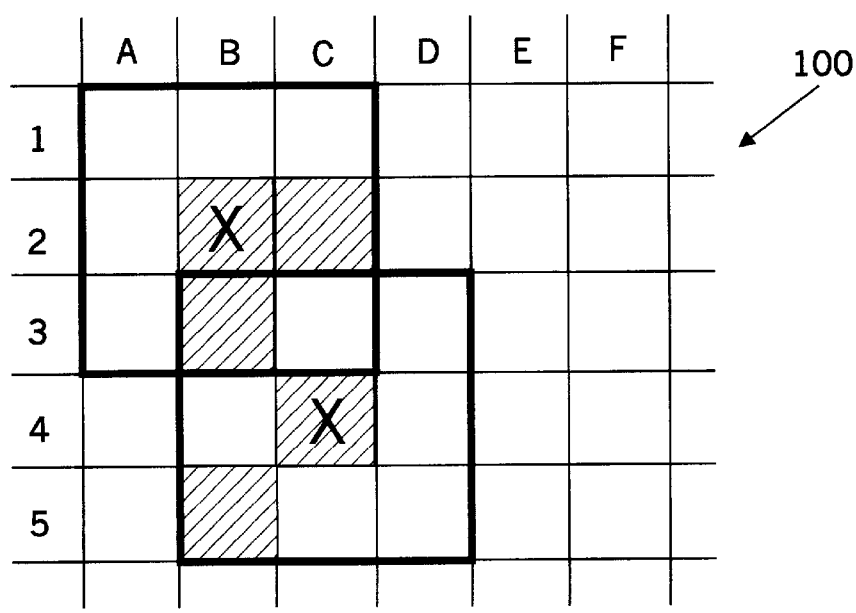
Figure 3A:
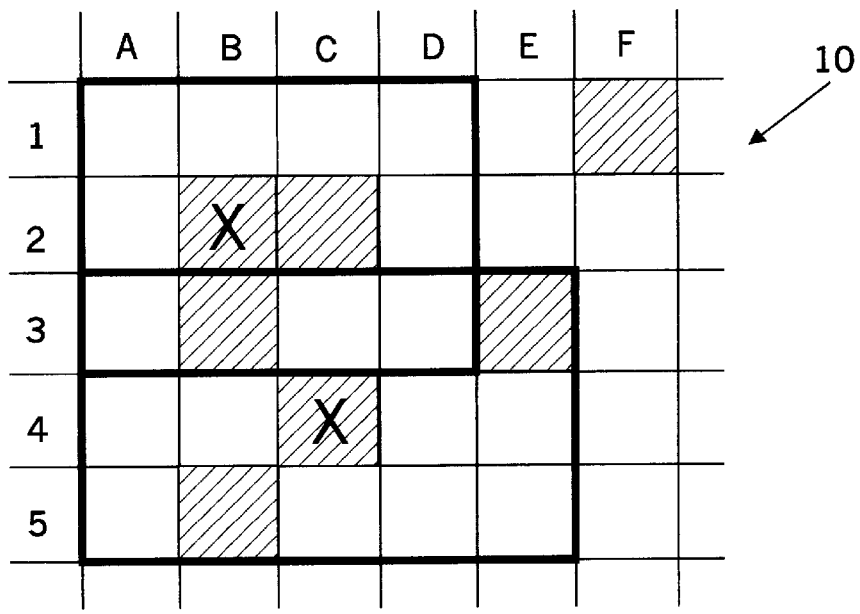
FIGS. 3*a–b* show the corresponding adjacent image restoration with one restoration area containing 5×3 image points and one containing 4×3 image points.
Figure 3B:
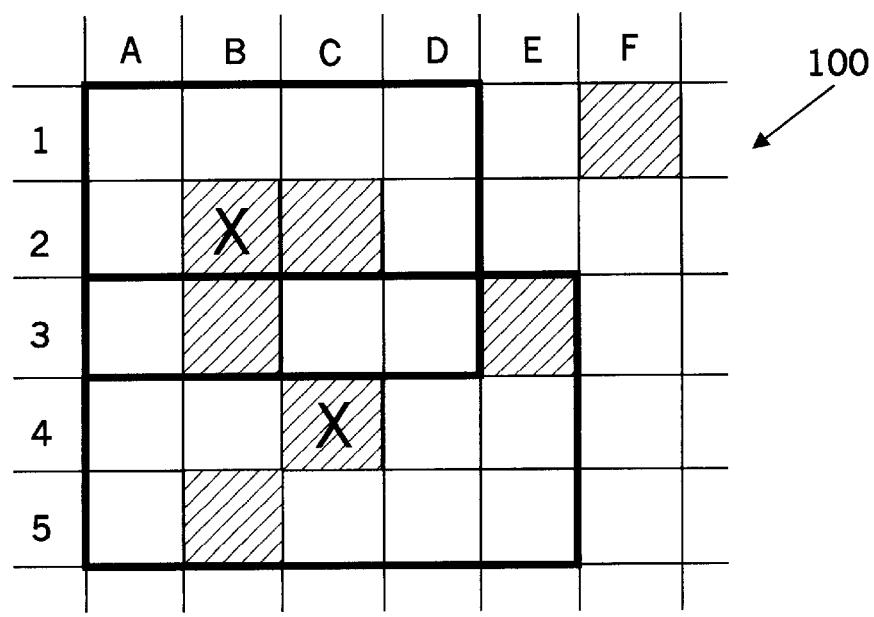

An individual restoration area is now applied around each of the image points of the initial image FIG. 1b which contains an item of information, i.e. the information points B2 and B5, both in section 10 and in section 100. In the further course of the procedure, it is intended that information points should be marked with an "x", which will set out a restoration area for better identification. FIGS. 2a–b show the adjacent point restoration with a restoration range containing 3×3 image points; FIGS. 3a–b show the corresponding adjacent point restoration with one restoration range of 5×3 image points, and one restoration range containing 4×3 image points.

It can be seen from FIG. 2a that the restoration range containing the 3×3 image points encompasses the image points C2 and B3, around the information point B2. The restoration range about the information point C4, by contrast, which likewise contains 3×3 image points, encompasses the image points B3 and B5. These image points C2, B3, and B5, as newly-restored image points, are now either incorporated into the initial image according to FIG. 2b, or deposited separately, but together with the information points B2 and C4. It can be seen from FIGS. 2a and 2b that by selecting the restoration areas which contain the 3×3 image points, the trace B2, C2, B3, C4 and B5 can be entirely restored. while the image points located further away, F1 and E3 (e.g. the accidental contamination) have, by contrast, been filtered out.

It can be seen from FIG. 3a that the restoration area containing the 4×3 image points about the information point B2 likewise encompasses the image points C2 and B3. The restoration area containing the 5×3 image points, about the information point C4, by contrast, encompasses not only the image points B3 and B5, but in this case also the information point E3. As a result, thanks to the selection of a larger restoration area than that in FIG. 2, not only is the trace B2, C2, B3, C4 and B5 restored, but also the image point E3, which is not immediately adjacent, and the newly-restored image points can either be incorporated into the initial image according to FIG. 3b, or deposited separately, with the information points B2 and C4.

It is clear from the examples of FIGS. 2 and 3 that the selection of the size of the restoration area comes to play an important part. It should however also be emphasized that individual instances of contamination which may occur, which are not located in the immediate vicinity of the main information of a document, can be well suppressed even with relatively large restoration areas, using the process according to the invention.

If the newly-restored image points are incorporated in the initial image, and thus form a new initial image for a further restoration process, then traces which are inter-related can in particular be restored advantageously. A successive restoration can be carried out in such a way, for example, that the restorations of all the information points originally present in the initial image can be carried out simultaneously in one initial step, and the newly acquired information is written into the initial image. This supplemented initial image now shows new information points, and can then serve as an initial image for a further restoration stage, and so on. In this context, it is to be understood that a new restoration stage need only be carried out in each case only with the information points newly obtained from the preceding restoration stage. FIGS. 4a–f show such a successive restoration as a sequence.

Figures 4A, 4B:
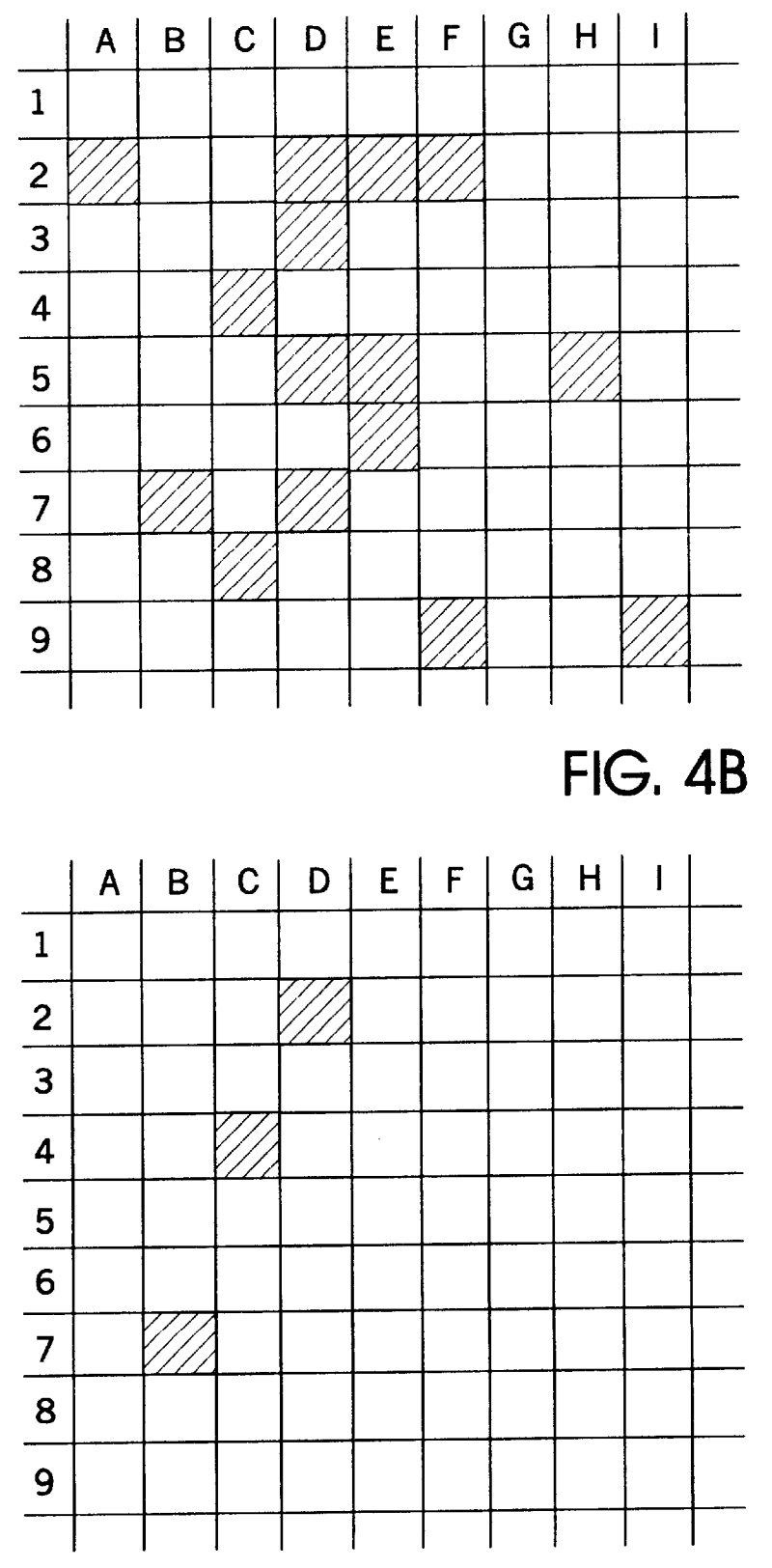
Figures 4C, 4D:
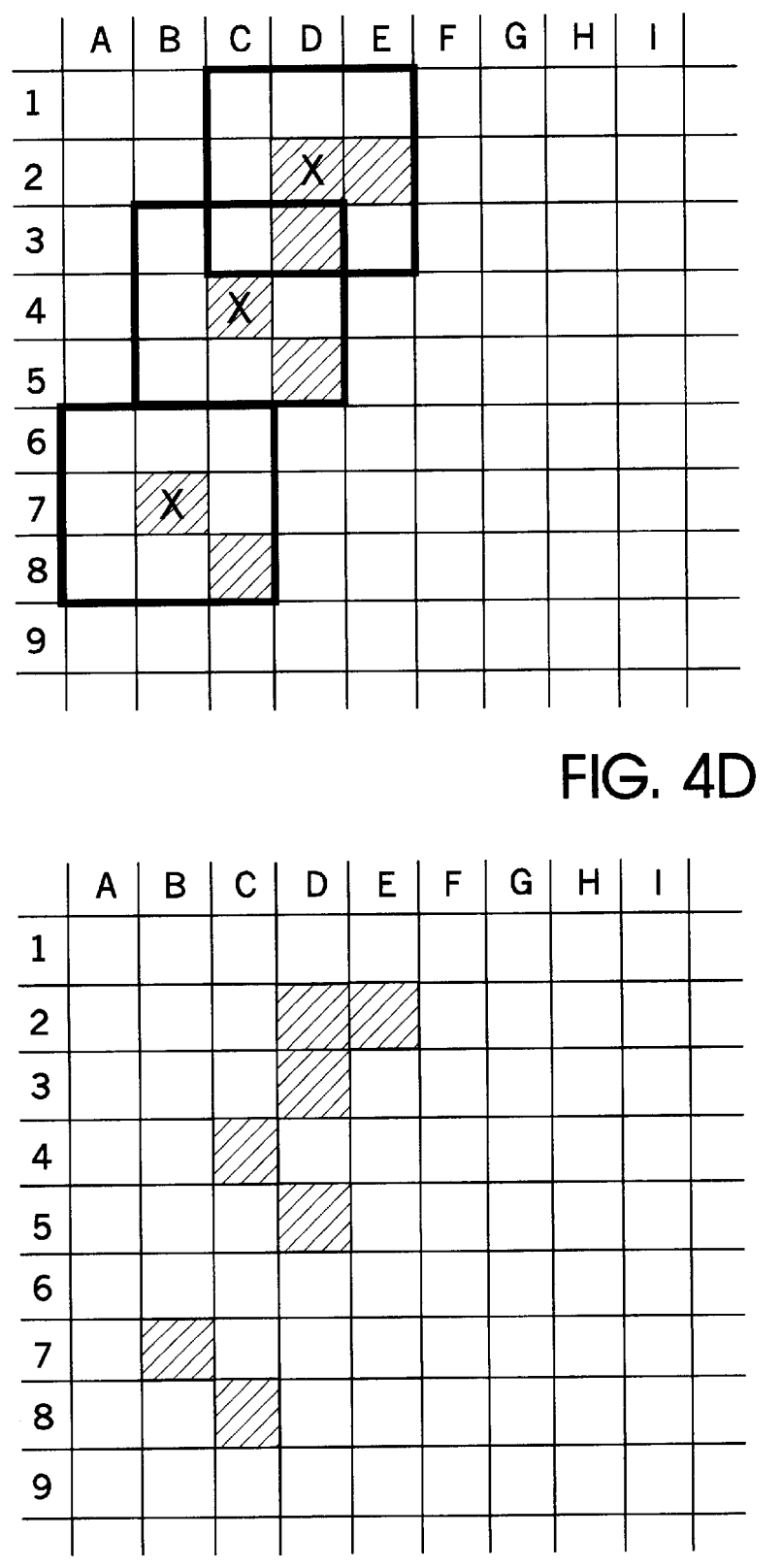
Figure 4E:
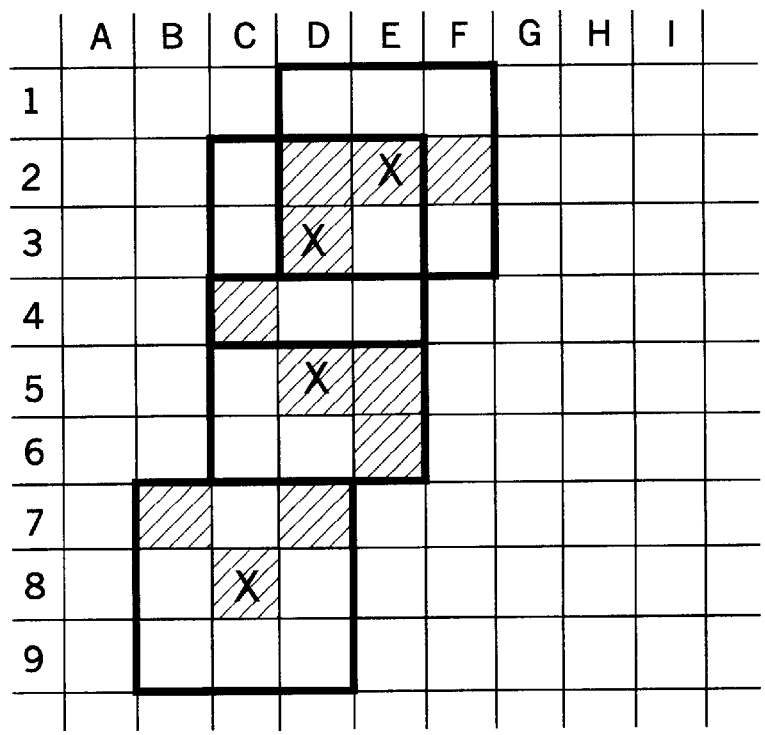
Figure 4F:
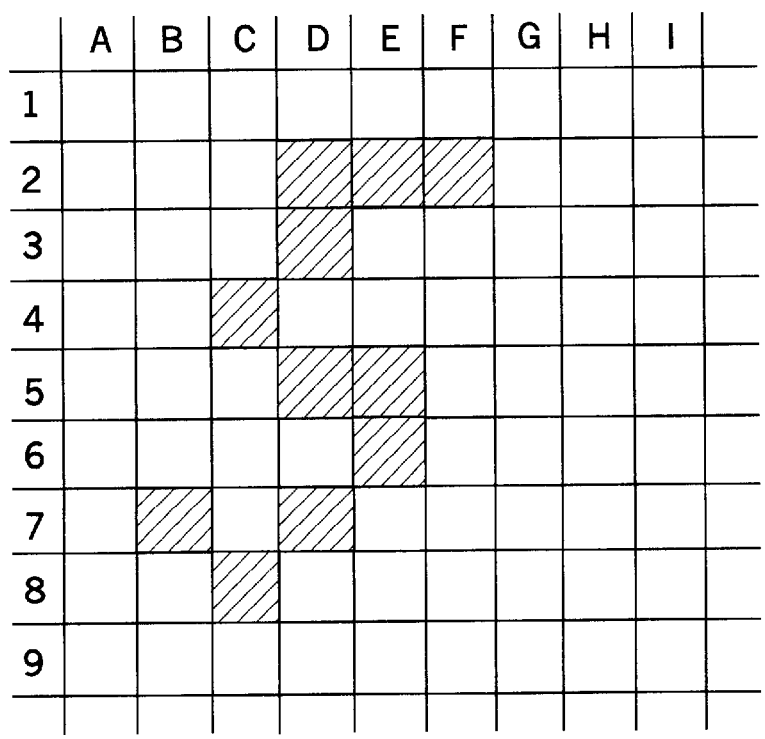

FIG. 4a shows the reference image, and FIG. 4b the corresponding initial image. Taking the information points from FIG. 4b as a starting point, as shown in FIG. 4c, an initial restoration is carried out with restoration areas containing 3×3 image points about the individual information points. The image points which are acquired in this way are written into the initial image, and the original initial image, modified, which is obtained in this way is used as a new initial image (FIG. 4d). A further information stage, based on the newly-acquired information points, provides further information points (FIG. 4e), which are again written into the initial image (FIG. 4f). The image shown in FIG. 4f is the result of the successive restoration. In this context it should be noted that the associated trace, formed from the image points F2, E2, D2, D3, C4, D5, E5, E6, D7, C8 and B7, have been completely reconstructed, while individual points, such as the points A2, H5, F9 and I9, have not been reconstructed and have therefore been eliminated.

Another successive restoration can, for example, be carried out in such a manner that the restoration starts at an original information point (e.g. a corner point). The information which is acquired by the restoration about the first information point is written directly into the initial image. This supplemented initial image, in which the supplemented image points now represent new information points, then serve as the initial image for the next information point, and so on. Thus, for example, a restoration can be carried out in a recursive manner, line by line. In this context, it is to be understood that this line-by-line process must, if necessary, be run through several times over.

Figure 5A:
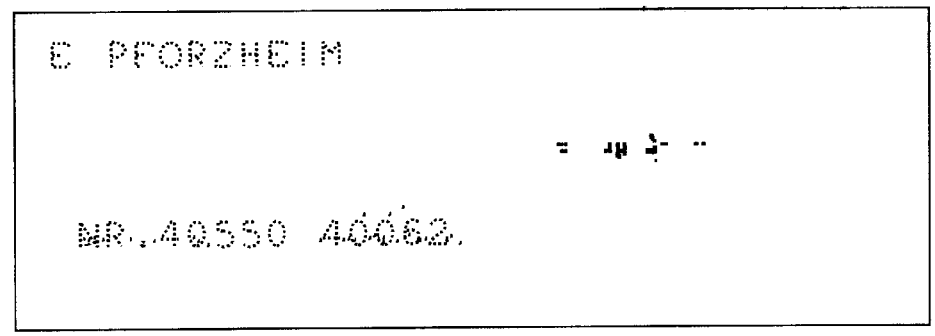
FIGS. 5*a–d* show an example application of the invention.
Figure 5B:
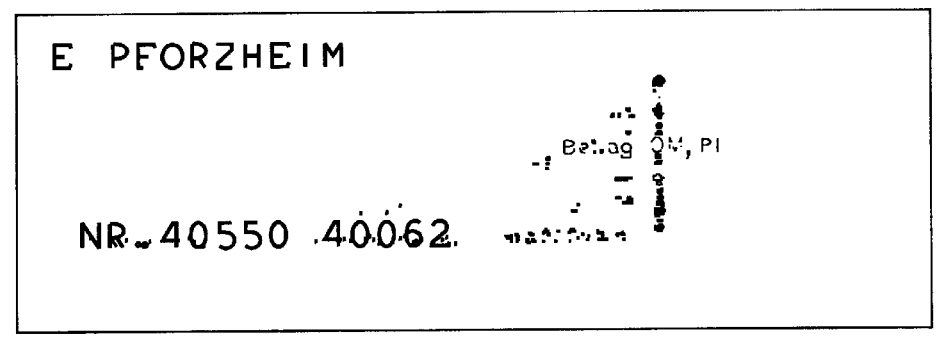
Figure 5C:
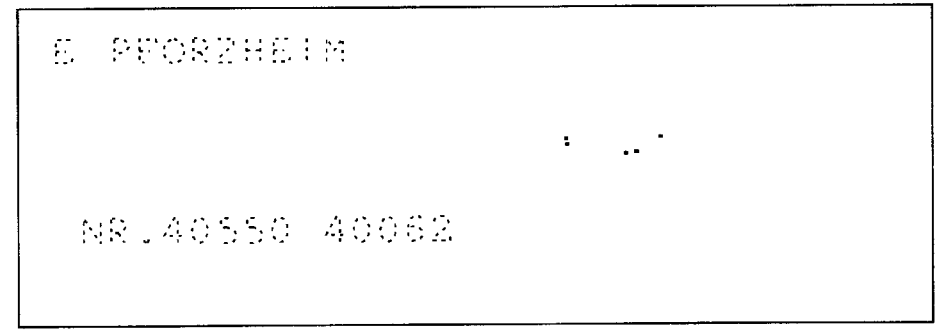
Figure 5D:
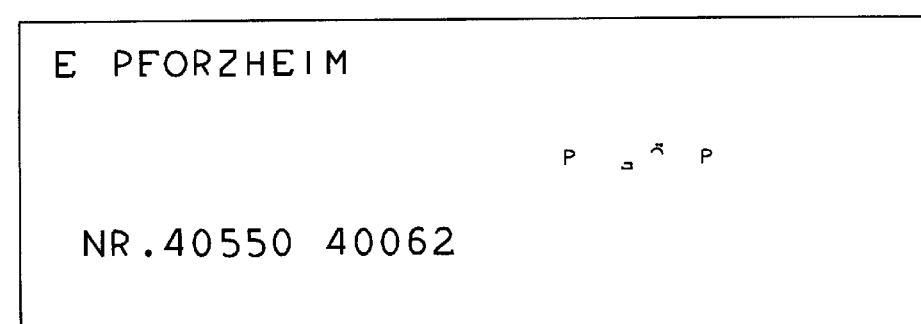

FIGS. 5a–d show an example application of the invention. FIG. 5a shows the document for the restoration process according to the invention. FIG. 5b shows a black/white image processed by a threshold into binary, which has been filtered with a threshold value of about 90%, of the document from FIG. 5a, which is intended to serve as a reference image for the restoration. FIG. 5c shows a binarised black/white image of the document from FIG. a, filtered with a threshold value of some 50%, which serves as the initial image for the restoration. FIG. 5d shows the result of the restoration of the initial image carried out with the help of the reference image. It can be seen from this that the process according to the invention allows for a suitable separation of the foreground and background information, so that subsequent image processing stages can be successfully carried out.

Of course, the foregoing description of the preferred embodiment should be considered as illustrative of the principle of the present invention and not in limitation thereof, since the scope of the present invention is as provided in the following claims. Many modifications and adoptions would be apparent to those skilled in the art, and some features o the present invention could be used to advantage without the corresponding use of other features.

What is claimed is:

1. A method for separating foreground information from background information in a document, comprising the steps of:
   generating a first image and a second image from the document using two different filtering techniques where the first image is generated in such a way as to leave substantially only foreground information;
   using the first image as a starting image for image restoration and the second image as a reference image for image restoration; and
   restoring foreground information lost in the generation of the first image using information retained in the generation of the second image.

2. A method according to claim 1, in which the selection of the information to be restored from the second image into the first image is made by means of adjacent point analysis.

3. A method in accordance with claim 2, wherein, the adjacent point analysis comprises:
   selecting a restoration area of a size around an information point in the first image;
   restoring to the first image from the second image, those information points from the second image that are within the selected restoration area.

4. A method according to claim 3, in which each area of a size around each information point in the first image is of substantially the same size.

5. A method according to claim 3 in which the size of an area around an individual information point in the first image is determined by other information points immediately surrounding the individual information point.

6. A method according to claim 1 wherein selecting information which is to be supplemented from the reference images in a second stage includes analyzing information density in the first image.

7. A method in accordance with claim 1, wherein the supplementing step includes incorporating new information into the first image.

8. A method according to claim 1, wherein the supplementing step includes depositing information together with information from the first image, into a new results image.

9. A method according to claim 7, wherein the step of supplementing includes generating new information points.

10. A method according to claim 9, wherein successive supplementing of the first image is carried out by selecting information from the second image and depositing the selected information into the first image, and repeating selecting and depositing information which is to be supplemented, from the new initial image which is received in each case.

11. A method according to claim 1, including using as a reference image an unfiltered image of the document.

12. A process according to claim 1, including using as a first image, a color-filtered image.

13. A process according to claim 12, in which the step of generating is a threshold value filtering process.

14. A system for separating foreground information from background information in a document, comprising:

means for generating a first image and a second image from the document using two different filtering techniques where the first image is generated in such a way as to leave substantially only foreground information;

means for analyzing the first image to identify areas for restoration of substantially only foreground information into the first image from information in the second image; and means for restoring foreground information lost in the generation of the first image using information retained in the generation of the second image.

* * * * *